United States Patent
Lin et al.

(10) Patent No.: US 8,319,839 B2
(45) Date of Patent: Nov. 27, 2012

(54) OPTICAL IMAGE SYSTEM

(75) Inventors: Li-Pen Lin, Taipei (TW); Kuang-Che Chen, Taipei (TW); Wen-Chi Shih, Taipei (TW); Ying-Shou Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 242 days.

(21) Appl. No.: 12/960,176

(22) Filed: Dec. 3, 2010

(65) Prior Publication Data
US 2012/0044368 A1    Feb. 23, 2012

(30) Foreign Application Priority Data
Aug. 20, 2010  (TW) .............................. 99127870 A (51) Int. Cl.
*H04N 5/228* (2006.01)

(52) U.S. Cl. ............... 348/208.2; 348/208.7; 348/208.8; 348/208.12

(58) Field of Classification Search .............. 348/208.2, 348/208.7, 208.8, 208.12; 396/52–55
See application file for complete search history.

(56) References Cited

U.S. PATENT DOCUMENTS

| | | | |
|---|---|---|---|
| 6,940,542 B2* | 9/2005 | Kitazawa et al. | 348/208.99 |
| 2007/0236577 A1* | 10/2007 | Ke et al. | 348/208.99 |
| 2009/0002500 A1* | 1/2009 | Kawai et al. | 348/208.11 |

* cited by examiner

*Primary Examiner* — Nhan T Tran
*Assistant Examiner* — Yih-Sien Kao
(74) *Attorney, Agent, or Firm* — Kirton McConkie; Evan R. Witt (57) ABSTRACT

An optical image system includes an image pickup module, a swinging mechanism, a first swinging calibration element and a second swinging calibration element. When the optical image system is tilted because of handshaking, the image pickup module is swung by the swinging mechanism. At the same time, the first swinging calibration element and the second swinging calibration element detect whether the image pickup module is swung to an ideal position where the handshaking problem is eliminated.

11 Claims, 6 Drawing Sheets

OPTICAL IMAGE SYSTEM

FIELD OF THE INVENTION

The present invention relates to an optical image system, and more particularly to an image pickup module for use in a portable electronic device.

BACKGROUND OF THE INVENTION

Recently, a mobile communication device or a personal digital assistant (PDA) with an image-shooting function is widely used to shoot an object. When the image pickup module of the mobile communication device is used to shoot the object, the image pickup module is readily suffered from vibration because of an external force. The vibration resulting from the external force is usually referred as a handshaking action. Due to the handshaking action, the shot image is very blurred. For avoiding occurrence of handshaking, an optical image system with an anti-handshaking function has been disclosed.

Figure 1:
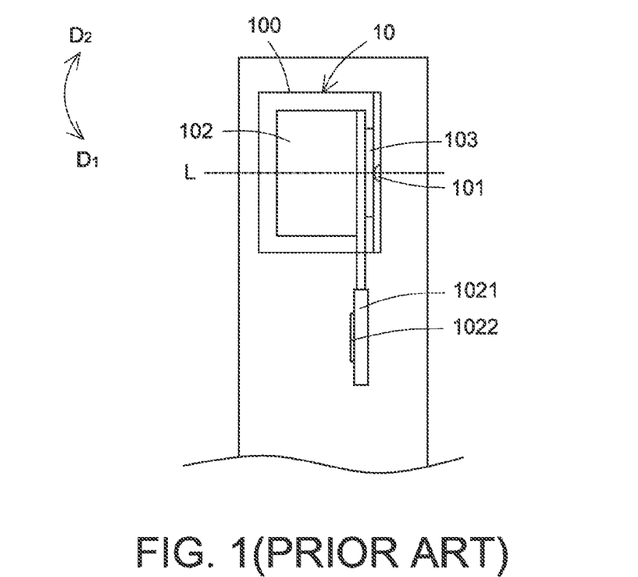
FIG. 1 is a schematic view illustrating an optical image system of a mobile communication device according to the prior art.

Take an image pickup module of a mobile communication device for example. FIG. 1 is a schematic view illustrating an optical image system of a mobile communication device according to the prior art. The mobile communication device 1 comprises an optical image system 10. The optical image system 10 comprises a casing 100, a supporting part 101, an image pickup module 102, a vibration detecting element 103 and a swinging mechanism 104 (see FIG. 2). In addition, the optical image system 10 has an optical axis L. The supporting part 101 is arranged along the optical axis L. The image pickup module 102 is used for shooting an object to acquire an image. The image pickup module 102 is disposed on the supporting part 101, and may be swung with respect to the supporting part 101. The image pickup module 102 comprises a circuit board 1021 and a controlling unit 1022. The controlling unit 1022 is mounted on the circuit board 1021. In addition, the controlling unit 1022 is electrically connected with the vibration detecting element 103 and the swinging mechanism 104 (see FIG. 2). The vibration detecting element 103 is disposed within the optical image system 10 for detecting the tilting condition of the optical image system 10. The vibration detecting element 103 is for example a gyroscope. The swinging mechanism 104 is used for controlling a swinging action of the image pickup module 102.

Figure 2:
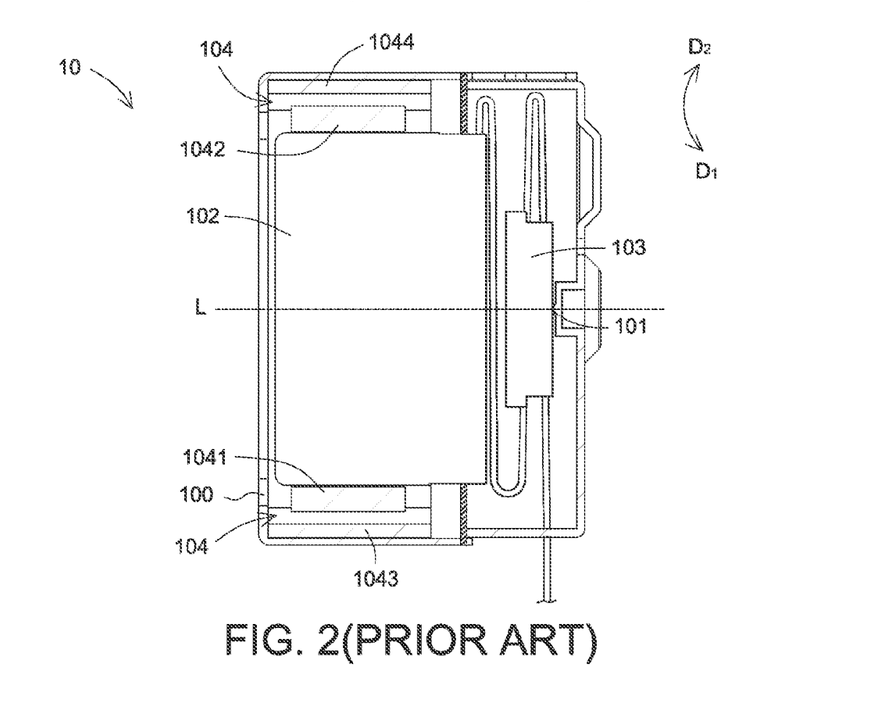
FIG. 2 is a schematic cross-sectional view illustrating the conventional optical image system.

Hereinafter, the detailed structure of the optical image system 10 will be illustrated with reference to FIG. 2. FIG. 2 is a schematic cross-sectional view illustrating the conventional optical image system. As show in FIG. 2, the image pickup module 102 may be swung with respect to the supporting part 101 in four directions, including a first direction D1, a second direction D2, a third direction (not shown) and a fourth direction (not shown). The third direction is perpendicular to the first direction D1. The fourth direction is opposed to the third direction. As is well known in the art, the image pickup module 102 is rotated around the pitch axis when the image pickup module 102 is swung in the first direction D1 and the second direction D2; and the image pickup module 102 is rotated around the yaw axis when the image pickup module 102 is swung in the third direction and the fourth direction. The swinging mechanism 104 comprises plural magnetic winding coils 1041, 1042 and plural magnetic elements 1043, 1044. The plural magnetic winding coils 1041 and 1042 are disposed around the image pickup module 102. The plural magnetic elements 1043 and 1044 are disposed on the casing 100, and arranged in the vicinity of the magnetic winding coils 1041 and 1042 around the image pickup module 102. The magnetic elements 1043 and 1044 are for example magnets. Each magnetic winding coil and each magnetic element cooperate with each other to control the image pickup module 102 to be swung in a specified direction. The first magnetic winding coil 1041 and the first magnetic element 1043 cooperate with each other to control the image pickup module 102 to be swung in the first direction D1. The second magnetic winding coil 1042 and the second magnetic element 1044 cooperate with each other to control the image pickup module 102 to be swung in the second direction D2. The third magnetic winding coil (not shown) and the third magnetic element (not shown) cooperate with each other to control the image pickup module 102 to be swung in the third direction D3. The fourth magnetic winding coil (not shown) and the fourth magnetic element (not shown) cooperate with each other to control the image pickup module 102 to be swung in the fourth direction D4.

Figure 3A:
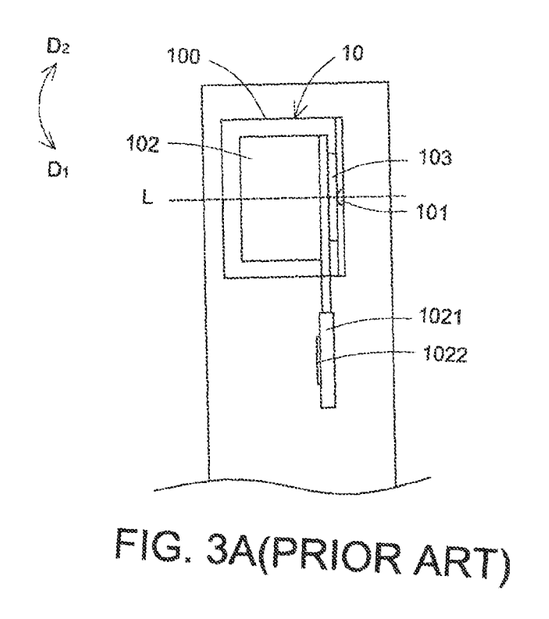
FIGS. 3A and 3B are schematic views illustrating a process of performing an anti-handshaking operation according to the prior art.

Hereinafter, the operations of the optical image system with an anti-handshaking function will be illustrated in more details. Please refer to FIG. 1 again. In a case that the mobile communication device 1 is in a static status, the optical axis L of the image pickup module 102 is parallel with the optical image system 10. Meanwhile, the optical axis L is also parallel with the horizontal line. In a case that the optical image system 10 of the mobile communication device 1 is used to shoot an object but suffered from a handshaking action, the mobile communication device 1, the optical image system 10 and the image pickup module 102 are tilted in the first direction D1. Meanwhile, the optical axis L is no longer parallel with the horizontal line (see FIG. 3A). Due to the handshaking action, the image acquired by the image pickup module 102 in the tilted status is usually blurred. For preventing from acquiring the blurred image, a tilt angle compensation process is performed. For example, in a case that the mobile communication device 1, the optical image system 10 and the image pickup module 102 are all tilted in the first direction D1, an angular velocity of the optical image system 10 tilted toward the first direction D1 is detected by the vibration detecting element 103. By the vibration detecting element 103, the angular velocity is converted into an angle change amount (e.g. positive 5 degrees). Assuming that the tilt angle of the optical image system 10 tilted toward the first direction D1 is positive, the tilt angle of the optical image system 10 tilted toward the second direction D2 is negative. According to the angle change amount (e.g. positive 5 degrees), the vibration detecting element 103 issues a tilt angle compensation signal to the controlling unit 1022.

Figure 3B:
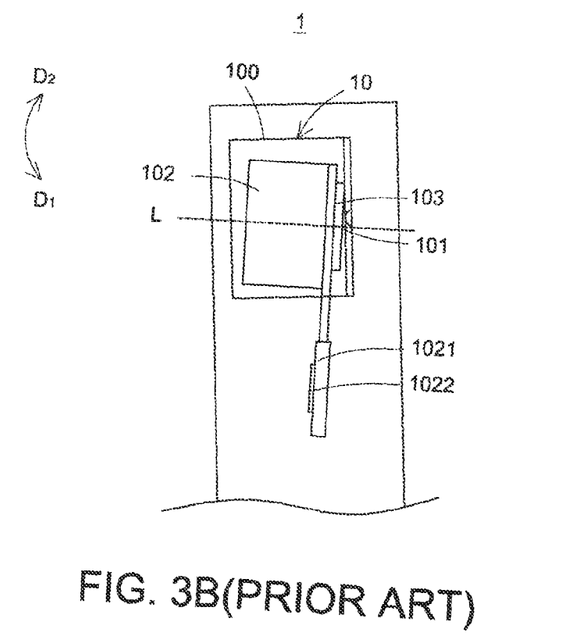

According to the tilt angle compensation signal, the controlling unit 1022 issues a negative 5-degree driving signal. In response to the negative 5-degree driving signal, the swinging mechanism 104 is controlled to make a negative 5-degree swinging action. In this situation, the image pickup module 102 is swung 5 degrees in the second direction D2 to perform a compensation swinging action. At the same time, an electric current flows through the second magnetic winding coil 1042 of the swinging mechanism 104 to generate a magnetic field. Due to the magnetic field, the second magnetic winding coil 1042 is attracted by the second magnetic element 1044, and thus the image pickup module 102 is swung 5 degrees in the second direction D2. Meanwhile, the image pickup module 102 and the optical axis L are both parallel with the horizontal line without being tilted (see FIG. 3B). Since the influence of the handshaking action on the image pickup module 102, the image acquired by the image pickup module 102 is sharp.

Ideally, the swinging mechanism 104 is controlled by the controlling unit 1022 to make a negative 5-degree swinging action. However, because of many factors, the image pickup module 102 is practically swung an angle smaller than 5 degrees in the second direction D2 (e.g. 3 degrees). In this situation, the image pickup module 102 and the optical axis L are tilted and not parallel with the horizontal line, and thus the image acquired by the image pickup module 102 is still blurred because of handshaking.

SUMMARY OF THE INVENTION

The present invention provides an image pickup module with an anti-handshaking function.

In accordance with an aspect of the present invention, there is provided an optical image system for use in a portable electronic device. The portable electronic device includes a vibration detecting element connected with the optical image system. The vibration detecting element is used detecting a tilting condition of the optical image system and generating a tilt angle compensation signal according to the tilting condition. The optical image system has an optical axis. The optical image system includes a supporting part, an image pickup module, a swinging mechanism, a first swinging calibration element and a second swinging calibration element. The supporting part is arranged along the optical axis. The image pickup module is disposed on the supporting part, and swung with respect to the supporting part. The swinging mechanism is used for allowing the image pickup module to perform a compensation swinging action according to the tilt angle compensation signal. The first swinging calibration element is disposed on a bottom surface of the image pickup module and arranged at a first side of the supporting part for detecting the compensation swinging action of the image pickup module in a first direction and a second direction. A first extension line passes through the first swinging calibration element and the supporting part. The second swinging calibration element is disposed on a bottom surface of the image pickup module and arranged at a second side of the supporting part for detecting the compensation swinging action of the image pickup module in a third direction and a fourth direction. A second extension line passes through the second swinging calibration element and the supporting part, and the first extension line and the second extension line are perpendicular to each other.

In an embodiment, the portable electronic device includes a main circuit board and a controlling unit. The main circuit board is connected with the image pickup module and the swinging mechanism. The vibration detecting element is mounted on the main circuit board. The controlling unit is disposed on the main circuit board for driving the swinging mechanism according to the tilt angle compensation signal.

In an embodiment, according to the tilt angle compensation signal, the image pickup module is set to be swung to a first position by the swinging mechanism. If the first swinging calibration element and the second swinging calibration element detect that the image pickup module is swung to a second position, the first swinging calibration element issues a first swinging calibration signal to the controlling unit and the second swinging calibration element issues a second swinging calibration signal to the controlling unit, and the image pickup module is controlled by the controlling unit to be swung from the second position to the first position according to the first swinging calibration signal and the second swinging calibration signal.

In an embodiment, the optical image system includes a flexible printed circuit (FPC) board, which is connected with the image pickup module and the main circuit board for transmitting the tilt angle compensation signal to the controlling unit.

In an embodiment, the vibration detecting element is a gyroscope.

In an embodiment, the image pickup module includes a base, an image pickup circuit board, an image sensor and a focusing mechanism. The base is disposed on a bottom surface of the image pickup module, and contacted with the supporting part. The image pickup circuit board is disposed on the base. The image sensor is disposed on the image pickup circuit board for receiving a light beam from an outside of the image pickup module, thereby generating an image, wherein the optical axis passes through the image sensor. The focusing mechanism is disposed over the image sensor for performing a focusing operation of the image pickup module. The optical axis passes through the focusing mechanism.

In an embodiment, the focusing mechanism includes a lens and a voice coil motor. The lens is used for focusing the light beam. The optical axis passes through the lens. The voice coil motor is used for moving the lens, thereby adjusting a focal length of the lens.

In an embodiment, the optical image system further includes a frame and a casing. The frame is sheathed around the image pickup module, and disposed around the image pickup module. The casing is used for sheltering the frame and the image pickup module.

In an embodiment, the swinging mechanism includes plural magnetic winding coils, plural magnetic elements and an elastic element. The magnetic winding coils are disposed on the frame. When an electric current flows through each of the magnetic winding coils, a magnetic field is generated. The magnetic elements are disposed on the casing and respectively arranged in the vicinity of the plural magnetic winding coils. In response to the magnetic field generated by the magnetic winding coil, a corresponding magnetic element is attracted or repelled to swing the image pickup module. The elastic element is connected with the image pickup module for stopping swinging the image pickup module and returning the image pickup module to an original position.

In an embodiment, the first swinging calibration element and the second swinging calibration element are photo reflectors. The portable electronic device is a mobile communication device or a personal digital assistant (PDA).

In an embodiment, the supporting part is a spherical article.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
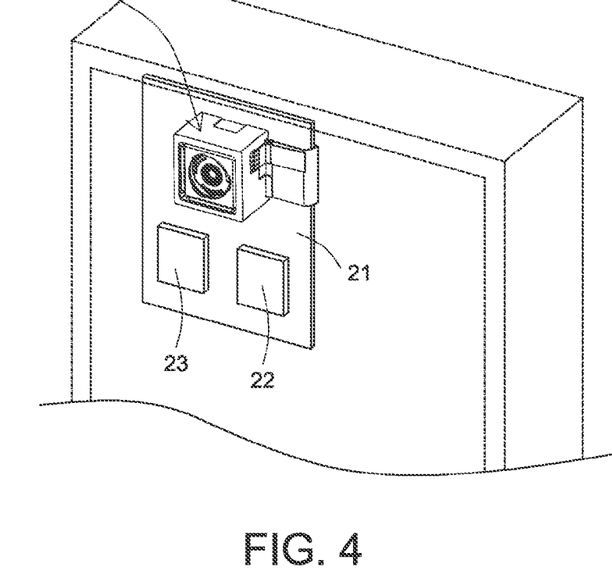
FIG. 4 is a schematic view illustrating an optical image system for use in a portable electronic device according to an embodiment of the present invention.

FIG. 4 is a schematic view illustrating an optical image system for use in a portable electronic device according to an embodiment of the present invention. The portable electronic device 2 comprises an optical image system 20, a main circuit board 21, a vibration detecting element 22 and a controlling unit 23. The optical image system 20 has an optical axis L* (see FIG. 5). The optical image system 20 is in communication with the main circuit board 21. The vibration detecting element 22 is mounted on the main circuit board 21. The vibration detecting element 22 is also in communication with the optical image system 20. The vibration detecting element 22 is used for detecting the tilting condition of the optical image system 20, and generating a tilt angle compensation signal according to the tilting condition of the optical image system 20. The controlling unit 23 is disposed on the on the main circuit board 21. In this embodiment, the controlling unit 23 is a microprocessor, the vibration detecting element 22 is a gyroscope, and the portable electronic device 2 is a mobile communication device or a personal digital assistant (PDA).

Figure 5:
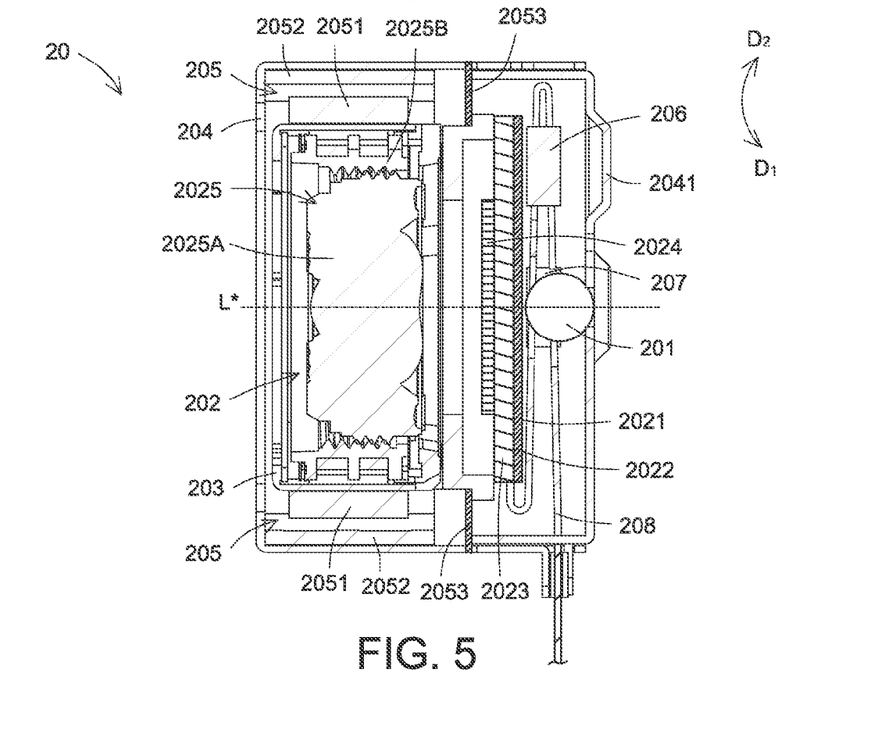
FIG. 5 is a schematic cross-sectional view illustrating an optical image system according to an embodiment of the present invention.

FIG. 5 is a schematic cross-sectional view illustrating an optical image system according to an embodiment of the present invention. The optical image system 20 comprises a supporting part 201, an image pickup module 202, a frame 203, a casing 204, a swinging mechanism 205, a first swinging calibration element 206, a second swinging calibration element 207 (see FIG. 6), and a flexible printed circuit (FPC) board 208. The casing 204 comprises a casing bottom plate 2041. The supporting part 201 is disposed on the casing bottom plate 2041, and arranged along the optical axis L*. In this embodiment, the supporting part 201 is a spherical article. The image pickup module 202 is disposed on the supporting part 201, and may be swung with respect to the supporting part 201. The image pickup module 202 comprises a base 2022, an image pickup circuit board 2023, an image sensor 2024 and a focusing mechanism 2025. The base 2022 is disposed on a bottom surface 2021 of the image pickup module 202. A second surface of the base 2022 is contacted with the supporting part 201. The image pickup circuit board 2023 is disposed on a first surface of the base 2022. The image sensor 2024 is disposed on the image pickup circuit board 2023. In addition, the optical axis L* passes through the image sensor 2024. When a light beam from an outside of the image pickup module 202 is received by the image sensor 2024, an image is formed on the image sensor 2024. In this embodiment, the image sensor 2024 is a complementary metal-oxide-semiconductor (CMOS). The focusing mechanism 2025 is disposed over the image sensor 2024 for performing the focusing operation of the image pickup module 202. In addition, the optical axis L* passes through the focusing mechanism 2025. The focusing mechanism 2025 comprises a lens 2025A and a voice coil motor 2025B. The optical axis L* passes through the lens 2025A. The lens 2025A is used for focusing the light beam. The voice coil motor 2025B is used for moving the lens 2025A, thereby adjusting a focal length of the lens 2025A.

Please refer to FIG. 5 again. The frame 203 is sheathed around the image pickup module 202, and disposed around the image pickup module 202. The frame 203 and the image pickup module 202 are sheltered by the casing 204, so that the frame 203 and the image pickup module 202 are disposed within the casing 204. The swinging mechanism 205 is electrically connected with the controlling unit 23, which is disposed on the main circuit board 21. According to the tilt angle compensation signal, the controlling unit 23 controls the image pickup module 202 to perform a compensation swinging action. In this embodiment, the swinging mechanism 205 comprises plural magnetic winding coils 2051, plural magnetic elements 2052 and an elastic element 2053. The plural magnetic winding coils 2051 are disposed on the frame 203. When an electric current flows through each of the magnetic winding coils 2051, a magnetic field is generated. The plural magnetic elements 2052 are disposed on the casing 204 and respectively arranged in the vicinity of the plural magnetic winding coils 2051. In response to the magnetic fields generated by the plural magnetic winding coils 2051, corresponding magnetic elements 2052 are attracted or repelled to swing the image pickup module 202. The elastic element 2053 is connected with the image pickup module 202 for stopping the swinging action of the image pickup module 202 and returning the image pickup module 202 to the original position.

Figure 6:
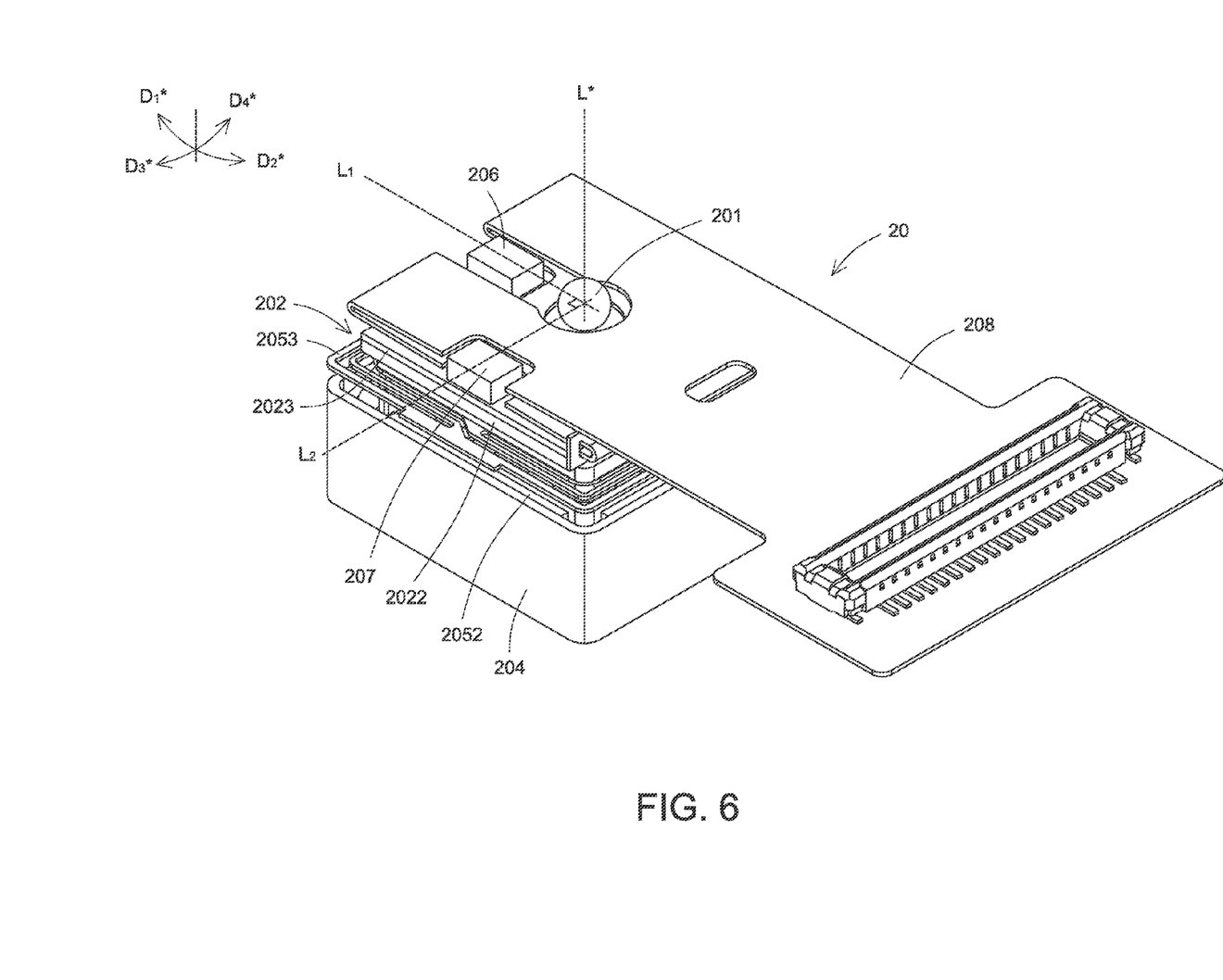
FIG. 6 is schematic partial perspective view illustrating an optical image system according to an embodiment of the present invention and taken from another viewpoint.

FIG. 6 is schematic partial perspective view illustrating an optical image system according to an embodiment of the present invention and taken from another viewpoint. Please refer to FIGS. 5 and 6. The first swinging calibration element 206 is disposed on the bottom surface 2021 of the image pickup module 202 (i.e. the second surface of the base 2022), and arranged at a first side of the supporting part 201. The first swinging calibration element 206 is used for detecting the compensation swinging action of the image pickup module 202 in a first direction D1* and a second direction D2*(i.e. around the pitch axis). In addition, a first extension line L1 passes through the first swinging calibration element 206 and the supporting part 201. The second swinging calibration element 207 is disposed on the bottom surface 2021 of the image pickup module 202 (i.e. the second surface of the base 2022), and arranged at a second side of the supporting part 201. The second swinging calibration element 207 is used for detecting the compensation swinging action of the image pickup module 202 in a third direction D3* and a fourth direction D4*(i.e. around the yaw axis). In addition, a second extension line L2 passes through the second swinging calibration element 207 and the supporting part 201. The first extension line L1 and the second extension line L2 are perpendicular to each other. In an embodiment, the first swinging calibration element 206 and the second swinging calibration element 207 are photo reflectors.

Moreover, the flexible printed circuit board 208 is connected with the image pickup circuit board 2023 and the main circuit board 21 of the portable electronic device 2 for transmitting the tilt angle compensation signal to the controlling unit 23. As shown in FIG. 5 and FIG. 6, a notch is formed in the flexible printed circuit board 208. Through the notch, the supporting part 201 is permitted to be disposed on the casing bottom plate 2041 of the casing 204, and the supporting part 201 may be contacted with the base 2022 of the image pickup module 202. In addition, through the notch, the first swinging calibration element 206 is not sheltered by the flexible printed circuit board 208. An edge of the flexible printed circuit board 208 is cut off, so that the second swinging calibration element 207 is not sheltered by the flexible printed circuit board 208.

Figure 7A:
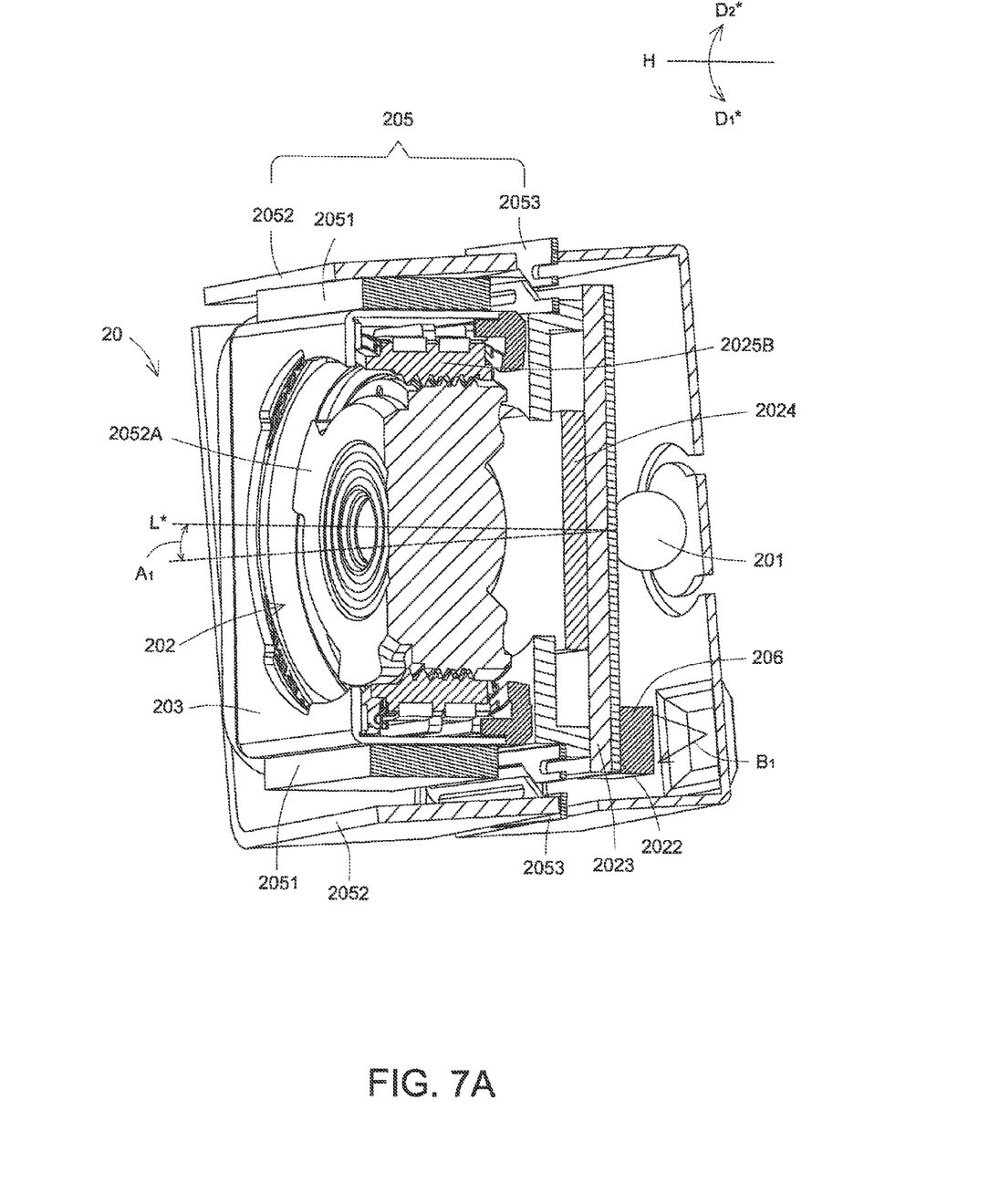
FIGS. 7A and 7B are schematic views illustrating a process of performing an anti-handshaking operation of the optical image system according to an embodiment of the present invention.
Figure 7B:
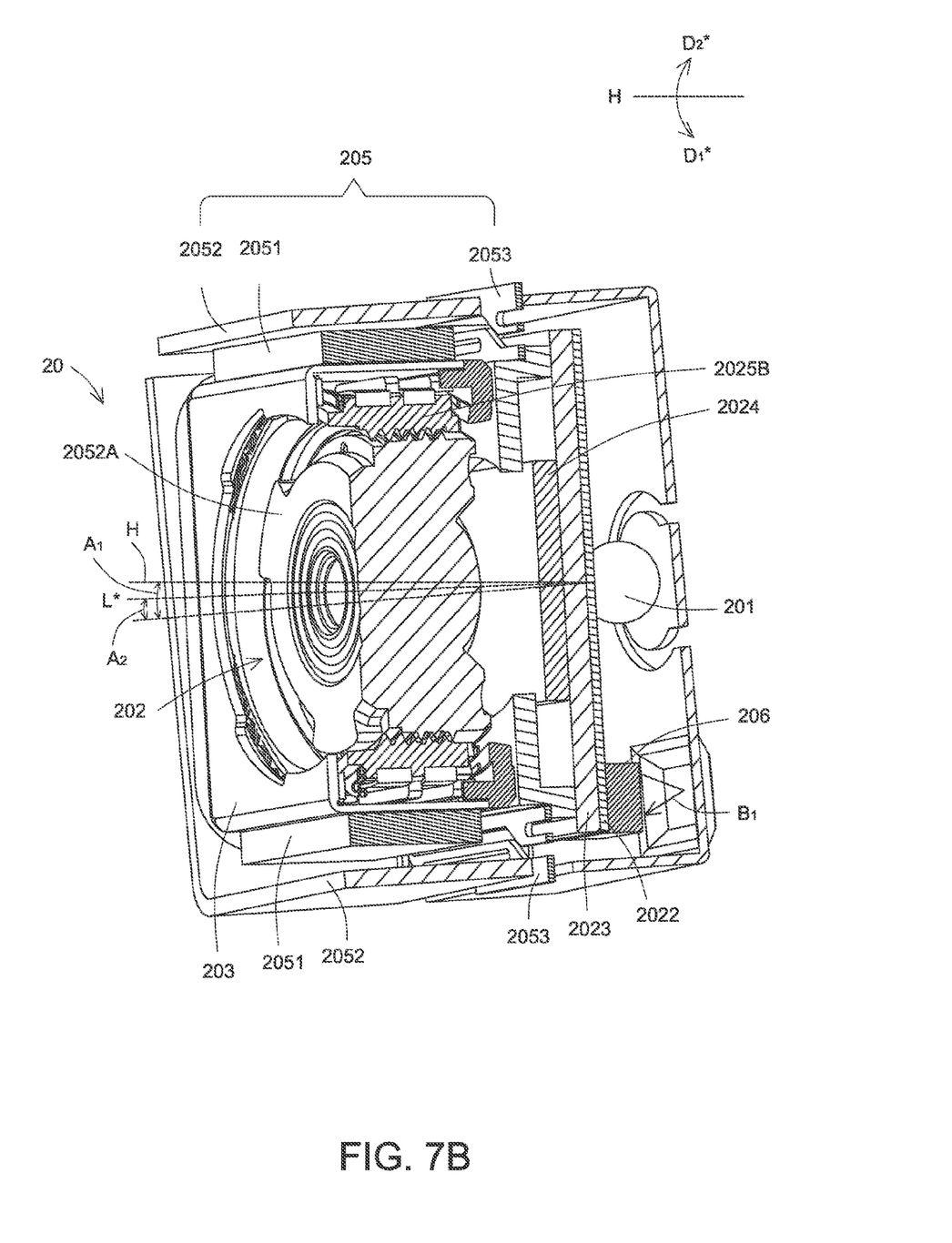

Hereinafter, a process of performing an anti-handshaking operation of the optical image system will be illustrated with reference to FIGS. 7A and 7B. FIGS. 7A and 7B are schematic views illustrating a process of performing an anti-handshaking operation of the optical image system according to an embodiment of the present invention. In a case that the optical image system 20 of the portable electronic device 2 is used to shoot an object but suffered from a handshaking action, the handshaking action causes the optical image system 20 and the image pickup module 202 to tilt in the first direction D1* at a first angle A1. For example, the first angle A1 is 5 degrees (i.e. positive 5 degrees). In addition, the optical axis L* is also tilted in the first direction D1*. Meanwhile, the tilting condition of the optical image system 20 is detected by the vibration detecting element 22. According to the tilting condition of the optical image system 20, the vibration detecting element 22 generates a tilt angle compensation signal. In response to the tilt angle compensation signal, the image pickup module 202 is tilted at the first angle A1 in the second direction D2*(i.e. negative 5 degrees). Through the flexible printed circuit board 208, the tilt angle compensation signal is transmitted to the controlling unit 23. According to the tilt angle compensation signal, the controlling unit 23 will control electrical conduction of the magnetic winding coil 2051 corresponding to the first direction D1*(i.e. the magnetic winding coil 2051 at the lower portion of FIG. 7A) and the magnetic winding coil 2051 corresponding to the second direction D2*(i.e. the magnetic winding coil 2051 at the upper portion of FIG. 7A) to generate magnetic fields, respectively. The magnetic field generated by the lower magnetic winding coil 2051 will attract the half-right portion of the lower magnetic element 2052 and repel the half-left portion of the lower magnetic element 2052. In addition, the magnetic field generated by the upper magnetic winding coil 2051 will attract the half-left portion of the upper magnetic element 2052 and repel the half-right portion of the upper magnetic element 2052.

In such way, the image pickup module 202 is tilted at the first angle A1 in the second direction D2*(i.e. negative 5 degrees) to be stayed at a first position to perform the compensation swinging action. When the image pickup module 202 is at the first position, the optical axis L* is parallel with the horizontal line H (see FIG. 7A).

Moreover, during the compensation swinging action of the image pickup module 202 is practically performed, the first swinging calibration element 206 detects the compensation swinging action of the image pickup module 202. That is, a first light beam B1 emitted by the first swinging calibration element 206 is projected onto the casing bottom plate 2041, and then the first light beam B1 is reflected by the casing bottom plate 2041 and received by the first swinging calibration element 206. After the compensation swinging action of the image pickup module 202 is performed, the image pickup module 202 is no longer parallel with the casing bottom plate 2041. Consequently, the angle between the image pickup module 202 and the casing bottom plate 2041 after the compensation swinging action of the image pickup module 202 is performed may be acquired by the first swinging calibration element 206 according to the reflected first light beam B1. Really, when the image pickup module 202 is at the first position P1, the angle between the image pickup module 202 and the casing bottom plate 2041 is equal to the first angle A1 in the second direction D2*(i.e. negative 5 degrees). However, because of many factors, the image pickup module 202 is practically swung a second angle A2 in the second direction D2* to a second position (see FIG. 7B). The second angle A2 (e.g. negative 3 degrees) is smaller than the first angle A1 (i.e. negative 5 degrees). Meanwhile, the first swinging calibration element 206 detects that the angle between the image pickup module 202 and the casing bottom plate 2041 is equal to the second angle A2. In addition, the first swinging calibration element 206 issues a first swinging calibration signal to the controlling unit 23.

After the first swinging calibration signal is received by the controlling unit 23, the controlling unit 23 realizes that the angle between the image pickup module 202 and the casing bottom plate 2041 is equal to the second angle A2 rather than the first angle A1. According to the first swinging calibration signal, the controlling unit 23 will control electrical conduction of the magnetic winding coil 2051 corresponding to the first direction D1*(i.e. the magnetic winding coil 2051 at the lower portion of FIG. 7A) and the magnetic winding coil 2051 corresponding to the second direction D2*(i.e. the magnetic winding coil 2051 at the upper portion of FIG. 7A) to generate magnetic fields, respectively. The magnetic field generated by the lower magnetic winding coil 2051 will attract the half-right portion of the lower magnetic element 2052 and repel the half-left portion of the lower magnetic element 2052. In addition, the magnetic field generated by the upper magnetic winding coil 2051 will attract the half-left portion of the upper magnetic element 2052 and repel the half-right portion of the upper magnetic element 2052

In such way, the image pickup module 202 is further swung an angle difference between the first angle A1 and the second angle A2 in the second direction D2*(i.e. 2 degrees), so that the image pickup module 202 is moved from the second position to first position.

The compensation swinging action of the image pickup module 202 is detected by the first swinging calibration element 206 again. When the first swinging calibration element 206 detects that the angle between the image pickup module 202 and the casing bottom plate 2041 is equal to the first angle A1 (i.e. the image pickup module 202 is at the first position), the first swinging calibration element 206 stops detecting the angle between the image pickup module 202 and the casing bottom plate 2041. On the other hand, if the angle between the image pickup module 202 and the casing bottom plate 2041 is not equal to the first angle A1, the first swinging calibration element 206 continuously detects the angle between the image pickup module 202 and the casing bottom plate 2041 until the image pickup module 202 is moved to the first position.

Similarly, when the compensation swinging action of the image pickup module 202 in the third direction D3* or the fourth direction D4* is performed, the second swinging calibration element 207 will detect the compensation swinging action of the image pickup module 202. The operating principle of the second swinging calibration element 207 is similar to that of the first swinging calibration element 206, and is not redundantly described herein. After the shooting operation of the optical image system 20 is finished, the elastic element 2053 that is connected with the image pickup module 202 will buffer the swinging action of the image pickup module 202. Consequently, the swinging action of the image pickup module 202 is stopped and the image pickup module 202 is returned to its original position.

It is noted that the optical image system of the present invention is a close-loop control system. That is, it is not necessary to additionally drive the first swinging calibration element and the second swinging calibration element. Whereas, the first swinging calibration element and the second swinging calibration element may continuously detect the swinging action of the image pickup module until the image pickup module stops swinging. Moreover, in the above embodiment of the optical image system, the swinging action of the image pickup module around a single axis (e.g. two directions) is detected at a time by using either the first swinging calibration element or the second swinging calibration element. Nevertheless, the swinging action of the image pickup module around two axes (e.g. four directions) may be synchronously detected by using both of the first swinging calibration element and the second swinging calibration element.

From the above description, the optical image system of the present invention uses the first swinging calibration element and the second swinging calibration element to detect the compensation swinging action of the image pickup module, thereby judging whether the image pickup module is swung to a position where the handshaking problem is eliminated. Moreover, the first swinging calibration element is arranged at a first side of the supporting part, the second swinging calibration element is arranged at a second side of the supporting part, a first extension line passes through the first swinging calibration element and the supporting part, and a second extension line passes through the second swinging calibration element and the supporting part, wherein the first extension line and the second extension line are perpendicular to each other. By undue experiments, it is found that an optimal detecting accuracy is achieved when the first swinging calibration element and the second swinging calibration element are respectively arranged in the first extension line and the second extension line, which are perpendicular to each other. Since the number of times of performing the compensation swinging action of the image pickup module is reduced, the use life of the optical image system will be prolonged. Moreover, since the vibration detecting element of the optical image system of the present invention is disposed outside the optical image system, the volume of the optical image system is minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical image system for use in a portable electronic device, said portable electronic device comprising a vibration detecting element connected with said optical image system, said vibration detecting element detecting a tilting condition of said optical image system and generating a tilt angle compensation signal according to said tilting condition, said optical image system having an optical axis, said optical image system comprising:

a supporting part arranged along said optical axis;

an image pickup module disposed on said supporting part, and swung with respect to said supporting part;

a swinging mechanism for allowing said image pickup module to perform a compensation swinging action according to said tilt angle compensation signal;

a first swinging calibration element disposed on a bottom surface of said image pickup module and arranged at a first side of said supporting part for detecting said compensation swinging action of said image pickup module in a first direction and a second direction, wherein a first extension line passes through said first swinging calibration element and said supporting part; and a second swinging calibration element disposed on said bottom surface of said image pickup module and arranged at a second side of said supporting part for detecting said compensation swinging action of said image pickup module in a third direction and a fourth direction, wherein a second extension line passes through said second swinging calibration element and said supporting part, and said first extension line and said second extension line are perpendicular to each other.

2. The optical image system according to claim 1 wherein said portable electronic device comprises:

a main circuit board connected with said image pickup module and said swinging mechanism, wherein said vibration detecting element is mounted on said main circuit board; and a controlling unit disposed on said main circuit board for driving said swinging mechanism according to said tilt angle compensation signal.

3. The optical image system according to claim 2 wherein according to the tilt angle compensation signal, said image pickup module is set to be swung to a first position by said swinging mechanism, wherein if said first swinging calibration element and said second swinging calibration element detect that said image pickup module is swung to a second position, said first swinging calibration element issues a first swinging calibration signal to said controlling unit and said second swinging calibration element issues a second swinging calibration signal to said controlling unit, and said image pickup module is controlled by said controlling unit to be swung from said second position to said first position according to said first swinging calibration signal and said second swinging calibration signal.

4. The optical image system according to claim 2 further comprising a flexible printed circuit (FPC) board, which is connected with said image pickup module and said main circuit board for transmitting said tilt angle compensation signal to said controlling unit.

5. The optical image system according to claim 1 wherein said vibration detecting element is a gyroscope.

6. The optical image system according to claim 1 wherein said image pickup module comprises:

a base disposed on a bottom surface of said image pickup module, and contacted with said supporting part;

an image pickup circuit board disposed on said base;

an image sensor disposed on said image pickup circuit board for receiving a light beam from an outside of said image pickup module, thereby generating an image, wherein said optical axis passes through said image sensor; and a focusing mechanism disposed over the image sensor for performing a focusing operation of said image pickup module, wherein said optical axis passes through said focusing mechanism.

7. The optical image system according to claim 6 wherein said focusing mechanism comprises:

a lens for focusing said light beam, wherein said optical axis passes through said lens; and a voice coil motor for moving said lens, thereby adjusting a focal length of said lens.

8. The optical image system according to claim 1 further comprising:

a frame sheathed around said image pickup module, and disposed around said image pickup module; and a casing for sheltering said frame and said image pickup module.

9. The optical image system according to claim 8 wherein said swinging mechanism comprises:

plural magnetic winding coils disposed on said frame, wherein when an electric current flows through each of said magnetic winding coils, a magnetic field is generated;

plural magnetic elements disposed on said casing and respectively arranged in the vicinity of said plural magnetic winding coils, wherein in response to said magnetic field generated by said magnetic winding coil, a corresponding magnetic element is attracted or repelled to swing said image pickup module; and an elastic element connected with said image pickup module for stopping swinging said image pickup module and returning said image pickup module to an original position.

10. The optical image system according to claim 1 wherein said first swinging calibration element and said second swinging calibration element are photo reflectors, and said portable electronic device is a mobile communication device or a personal digital assistant (PDA).

11. The optical image system according to claim 1 wherein said supporting part is a spherical article.

* * * * *